US010671979B2

(12) United States Patent
Goeppinger

(10) Patent No.: US 10,671,979 B2
(45) Date of Patent: *Jun. 2, 2020

(54) ONLINE REMITTANCE SYSTEM WITH METHODOLOGY FOR PREDICTING DISBURSEMENT TIMES OF ONLINE ELECTRONIC FUNDS TRANSFERS

(71) Applicant: PAYPAL, INC., San Jose, CA (US)

(72) Inventor: Cole Goeppinger, San Francisco, CA (US)

(73) Assignee: PayPal, Inc., San Jose, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 15/900,605

(22) Filed: Feb. 20, 2018

(65) Prior Publication Data

US 2018/0349859 A1 Dec. 6, 2018

Related U.S. Application Data

(63) Continuation of application No. 14/188,003, filed on Feb. 24, 2014, now Pat. No. 9,898,717.

(60) Provisional application No. 61/804,930, filed on Mar. 25, 2013.

(51) Int. Cl.
*G06Q 10/10* (2012.01)
*G06Q 20/10* (2012.01)
*G06Q 40/02* (2012.01)
*G06Q 10/06* (2012.01)

(52) U.S. Cl.
CPC ...... *G06Q 10/1095* (2013.01); *G06Q 10/06314* (2013.01); *G06Q 20/10* (2013.01); *G06Q 40/02* (2013.01)

(58) Field of Classification Search
USPC .......................................................... 705/30
See application file for complete search history.

(56) References Cited

U.S. PATENT DOCUMENTS 8,037,453 B1 * 10/2011 Zawadzki ............ G06F 11/368
717/107
2010/0030687 A1 * 2/2010 Panthaki ............ G06Q 20/108
705/43

* cited by examiner

*Primary Examiner* — Garcia Ade
(74) *Attorney, Agent, or Firm* — Kowert, Hood, Munyon, Rankin & Goetzel, P.C.

(57) ABSTRACT

An online remittance service system with a methodology for predicting disbursement times of online electronic funds transfers is disclosed. In one embodiment, for example, a method includes storing in computer memory a model of a disbursement process performed by one or more partners of the online remittance service for disbursing funds to payees in the destination country; based on the model, scheduling one or more computer-executable jobs with a job scheduling module representing one or more steps of the disbursement process; for each job of the one or more jobs, determining a next execution time for the job, the next execution time representing a time at which the job scheduling module will next execute the job after a specified time; and based on the next execution times for the one more jobs, determining a predicted time of disbursement of the online electronic funds transfer.

18 Claims, 5 Drawing Sheets

ONLINE REMITTANCE SYSTEM WITH METHODOLOGY FOR PREDICTING DISBURSEMENT TIMES OF ONLINE ELECTRONIC FUNDS TRANSFERS

CROSS REFERENCED TO RELATED APPLICATIONS

This application is a continuation of U.S. patent application Ser. No. 14/188,003, filed on Feb. 24, 2014 (issued as U.S. Pat. No. 9,898,717 on Feb. 20, 2018), which claims the benefit of Provisional Appln. 61/804,930, filed Mar. 25, 2013, the entire contents of which is hereby incorporated by reference in their entirety.

RELATED APPLICATIONS

This application is related to U.S. patent application Ser. No. 12/633,565 filed Dec. 8, 2009 and U.S. patent application Ser. No. 12/633,570 filed Dec. 8, 2009, the entire content of each of which is hereby incorporated by reference as if fully set forth herein.

TECHNICAL FIELD

The disclosed embodiments relate generally to online remittance systems, and more particularly, to online remittance systems with methodologies for predicting disbursement times of online electronic funds transfers.

BACKGROUND

With the recent explosive worldwide growth of Internet connectivity, the use of personal computing devices for electronically transferring money online has increased significantly in recent years. Such transfers are often referred to as online electronic funds transfers (or just "online EFTs"). Online EFTs can be intra- or inter-financial institution. In many inter-financial institution transfers, the financial institutions are located in different countries.

Online EFTs can be facilitated by an online remittance system accessible by personal computing devices over the Internet. Among other operations, the remittance system can require a payer to authenticate him or herself, select a source account from which funds will be withdrawn, specify a monetary amount to transfer, and specify a destination account into which the funds will be deposited. Based on the information provided by the payer, the online remittance system can initiate an online EFT through an automated clearing house or other electronic network for financial transactions, typically for a small fee charged to the payer.

Unfortunately, once the online EFT is initiated, it can be many hours or longer before the online remittance system receives confirmation of disbursement to the payee. A number of factors can affect the disbursement delay including fraud detection, verification of the source account, processing hours of the payment network, and destination financial institution location, hours, and holidays. As a result of this disbursement delay, it is typically not practical for the online remittance system to wait until disbursement to the payee is confirmed before providing confirmation to the payer that the online EFT has been initiated or before providing confirmation to the payer that payment has been processed.

What is needed then is a solution for providing during the disbursement delay guidance to the payer on when payment is expected to be disbursed to the payee. The present invention fulfills this and other needs.

SUMMARY OF SOME EMBODIMENTS

An online remittance service system with a methodology for predicting disbursement times of online electronic funds transfers is disclosed. In one embodiment, for example, a method for predicting disbursement time of an online electronic funds transfer to a payee in a destination country includes storing in computer memory a model of a disbursement process performed by one or more partners of the online remittance service for disbursing funds to payees in the destination country; based on the model, scheduling one or more computerexecutable jobs with a job scheduling module representing one or more steps of the disbursement process; for each job of the one or more jobs, determining a next execution time for the job, the next execution time representing a time at which the job scheduling module will next execute the job after a specified time; and based on the next execution times for the one or more jobs, determining a predicted time of disbursement of the online electronic funds transfer.

In another embodiment, for example, an online remittance service system comprises one or more processors; computer memory coupled to the one or more processors; and one or more non-transitory computer-readable media storing instructions which, when executed by the one or more processors; cause performance of a method for predicting disbursement time of an online electronic funds transfer to a payee in a destination country. The method includes: storing in the computer memory a model of a disbursement process performed by one or more partners of the online remittance service for disbursing funds to payees in the destination country; based on the model, scheduling one or more computer-executable jobs with a job scheduling module representing one or more steps of the disbursement process; for each job of the one or more jobs, determining a next execution time for the job, the next execution time representing a time at which the job scheduling module will next execute the job after a specified time; and based on the next execution times for the one or more jobs, determining a predicted time of disbursement of the online electronic funds transfer.

DESCRIPTION OF EMBODIMENTS

Introduction

Figure 1A:
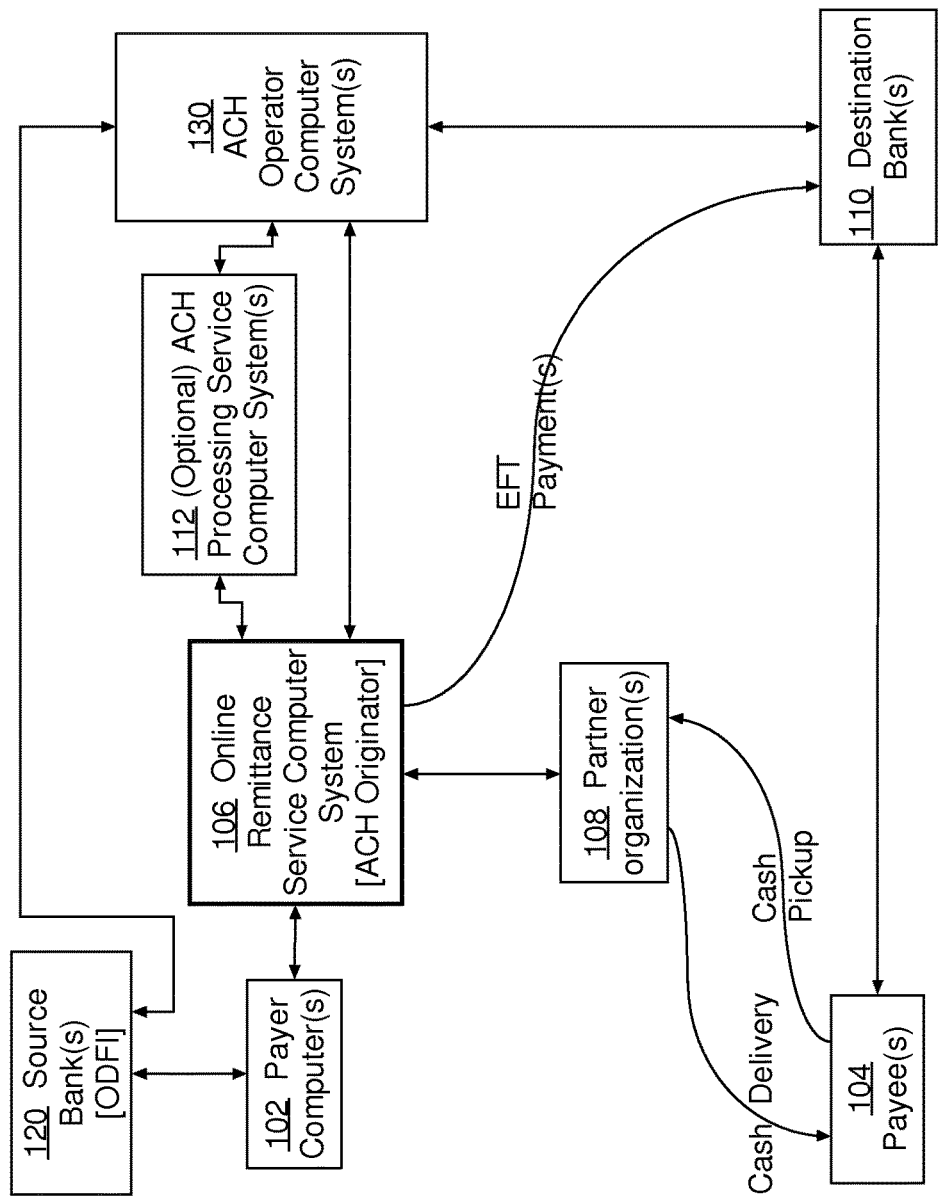
FIG. 1A is a block diagram illustrating a network environment of an online remittance service computer system.

The following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be understood that, although the terms first, second, etc. may be used herein to describe various elements, these elements should not be limited by these terms. These terms are only used to distinguish one element from another. For example, a first step could be termed a second step, and, similarly, a second step could be termed a first step, without departing from the scope of the present invention. The first step and the second step are both steps, but they are not the same step, unless otherwise clearly indicated.

The terminology used herein is for the purpose of describing particular embodiments only and is not intended to be limiting of the invention. As used herein, the singular forms "a", "an", and "the" are intended to include the plural forms as well, unless the context clearly indicates otherwise. Use of "criteria" may indicate either or both of the singular usage of the term, "criterion", or the plural form "criteria", or vice versa.

It will also be understood that the term "and/or" as used herein refers to and encompasses any and all possible combinations of one or more of the associated listed items. It will be further understood that the terms "comprises" and/or "comprising", when used herein, specify the presence of stated features, integers, steps, operations, elements, components and/or groups, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event" or "in response to detecting [the stated condition or event]," depending on the context.

Predicting Disbursement Time

An online remittance system (or just "remittance system") with a methodology for predicting disbursement times of online electronic funds transfers (or just "online EFTs") is disclosed. In some embodiments, the remittance system calculates a predicted time of disbursement to a payee in response to a request from a payer to initiate an online EFT to the payee. For example, the remittance system can calculate the predicted disbursement time in response to a HyperText Transfer Protocol (HTTP) request or a Secure HyperText Transfer Protocol (HTTPS) request from the payer's web browser. The predicated disbursement time can be provided to the payer in response to the payer's request. As one example, the predicated disbursement time can be sent to the payer's web browser in a HTTP or HTTPS response to the HTTP or HTTPS request to initiate the online EFT. As another example, the predicated disbursement time (or a hyperlink to a web page displaying the calculated prediction) can be sent to the payer in an e-mail message or text message. Significantly, the system and methodology can be employed to provide accurate predictions of when payer requested online EFTs will be disbursed to payees immediately after or soon after the online EFTs are requested by the payers.

The system and methodology of the present invention can be used to predicate disbursement times of online EFTs in which payers and payees are in different countries. Such prediction can include predicting disbursement processing time of organizations that the remittance system partners with to effectuate disbursement to payees in the destination countries.

A disbursement partner (or just "partner") for a destination country is responsible for disbursing the funds to the payee in the destination country. In some embodiments, disbursement by a partner involves depositing the funds in the payee's bank account in the destination country, making the funds available for cash pick-up by the payee at a location in the destination country, or delivering the funds in cash via courier to a location of the payee in the destination country. In some embodiments, disbursement to the payee is considered complete when the funds are deposited in the designated bank account, the funds are available for cash pick-up by the payee, or the cash funds are sent out for delivery by a courier. The system and methodology of the present invention can be used to predict when disbursement of an online EFT to a payee will complete, which may be hours to days after the online EFT is requested by the payer. The prediction can be made and provided to the payer immediately after or soon after (e.g., seconds or minutes after) the online EFT is requested by the payer. While in some embodiments the predicted time of disbursement is a prediction of when the disbursement will be complete, in other embodiments the predicted time of disbursement is a prediction of when the online remittance system receives confirmation from the partner that disbursement is complete, which may be after the funds have been deposited in the destination bank account, the funds are available for cash pick-up, or the funds are sent out for delivery by courier. In some embodiments, the online remittance system generates and provides to the payer both the predicted time of disbursement completion and the predicted time of confirmation from the partner.

In some embodiments, a prediction is made even before a payer has requested an online EFT. In these embodiments, the prediction can be provided to the payer after the payer has provided certain parameters of an online EFT such as the destination country and/or the method of disbursement but before the payer has actually requested the online EFT. For example, after the payer provides certain parameters of an online EFT to the system but before the payer has requested the online EFT, the system can generate a predicted time of disbursement based on the provided parameters. This predicated time can then be provided to the payer before the payer requests the online EFT. For example, the system may cause a web page or other user interface to be presented at the payer's computing device that informs the payer when disbursement to the payee would be expected if the online EFT is initiated at a certain time such as now or very soon in the future. For example, a web page that allows the payer to request an online EFT for which certain parameters have already been provided by the payer and for which a predicted time of disbursement has been generated can indicate the predicted time of disbursement such as with a text statement like "Send now and your money will there in X minutes", where X is based on the predicted time of disbursement.

Typically, partners process online EFT requests from the remittance system periodically and in batches according to a processing schedule, as opposed to processing them individually and on request. As well as being periodic, a partner processing schedule can be relative to a particular time zone and affected by "blackout periods" (e.g., national holidays in the destination country) when the partner will not process requests. For example, a partner for disbursing funds to a payee in India may process online EFT requests from the remittance system three times a day Monday through Friday at 9:00 am, 2:00 pm, and 4:30 pm Indian Standard Time and twice on Saturday at 9:00 am and 1O:OOam Indian Standard Time, except on Indian national holidays.

A partner can employ the services of one or more other partners (sub-partners of the partner) for carrying out disbursement to payees. Sub-partners can have their own periodic processing schedules that are different than the processing schedule of the primary partner. For example, a sub-partner for cash courier delivery can have its own different delivery schedule. Thus, partner processing of an online EFT request from the remittance system can involve multiple steps performed by multiple different organizations (e.g., partners and sub-partners) on different periodic processing schedules. For the purpose of providing clear examples, the term "partner" in the singular is used herein to refer a collection of partner organizations, banks, financial institutions, courier services, and any other service that the remittance system uses or partners with directly or indirectly to effectuate disbursements of online EFTs to payees in a destination country.

Partner-Specific Disbursement Processing Models

The remittance service of the present invention can calculate a predicted time of disbursement of an online EFT to a payee in a destination country based on a model of the processing scheduling of the partner used by the remittance system for disbursing funds to payees in the destination country. The processing schedule model can be represented by data stored in a computer memory of the remittance service. For example, the processing schedule model can be represented by data stored in a computer database of the online remittance service. Partner processing schedule models can be partner-specific. The remittance system can store a different partner-specific model for different partners. For example, a remittance system that operates in the United States and offers payers the ability to send money to payees India, the Philippines, and Mexico can store a model for the partner used for disbursing funds to payees in India, another model for the partner used for the Philippines, and yet another model for the partner for disbursing funds to payees in Mexico. In some embodiments, the remittance system stores multiple partner-specific models for the same destination country. In these embodiments, multiple predicted times of disbursement can be calculated for a given online EFT, one for each of the multiple partner-specific models. When selecting one of the partners for disbursement, the remittance system can select the partner with the earliest predicted time of disbursement.

A partner-specific model can include a number of "steps" corresponding to the periodically performed disbursement actions taken by the partner to disburse funds to payees in the destination country. A model can have more than one step. A step in the model can have duration, frequency, and an offset. The duration of a step represents the online remittance service's understanding of how long the partner takes to complete the corresponding disbursement action. The frequency and the offset of a step represent the remittance service's understanding of how often and when the partner initiates the corresponding disbursement action. The frequency of a step can be periodic according to the periodic schedule of the corresponding disbursement action. The periodic schedule can be relative to a particular time zone and can specify an "included" set of times when the partner initiates the corresponding disbursement action and an "excluded" set of times when the partner will not perform the corresponding disbursement action, even if the excluded time is in the set of included times. In other words, excluded times take precedence over included times. For example, the included set of times for a disbursement action may be three times a day Monday through Friday at 9:00 am, 2:00 pm, and 4:30 pm Indian Standard Time and twice on Saturday at 9:00 am and 1O:OOam Indian Standard Time and the excluded set of times for the disbursement action may be all Indian national holidays. Thus, in this example, the partner will not perform the disbursement action at a time in the included set of times that time falls on an Indian national holiday.

In some embodiments, a step of a model is associated with multiple sets of timing information where each set indicates duration, frequency, and offset for the step. For example, one set may be based on what the partner has communicated to the online remittance service what the duration, frequency, and offset for step should be and another set my be based on what the online remittance service has observed the duration, frequency, and offset to be based on historical performance of the step by the partner. In these embodiments, multiple predicted disbursement times can be calculated, one based on each of the sets.

Predicting Disbursement Time Using a Job Scheduling Module

The system and methodology of the present invention can calculate a predicted time of disbursement based on a partner-specific model of a partner's processing schedule and using a job scheduling module. The job scheduling module provides a programmatic interface by which computer-executable jobs can be scheduled for execution on a periodic basis according to a specified periodic schedule. In some embodiments, the programmatic interface provides the ability to schedule jobs for periodic execution using a "cron expression" for specifying the periodicity of execution. From the perspective of the job scheduling module, a job is a set of computer-executable instructions which the job scheduling module causes to be executed on a specified periodic basis. In addition to the programmatic interface for scheduling jobs, the job scheduling module provides a programmatic interface for determining when a scheduled job will next execute after a specified input time.

As used herein, the term "cron" refers generally to a computing process for scheduling computer-executable to be executed at specified times. An example of a cron is the cron daemon process available on many UNIX-variant operating systems. A "cron expression" refers generally to a human and computer-readable syntax for expressing the execution schedule of a job to be executed by a cron. In some embodiments, a "cron expression" is a character string having at least 5 fields separated by white space. The five fields can each correspond to different periods of time and can accept different values. For example, the cron expression "15 16 1\*\*" can be used to schedule a job for execution at 4:15 pm on the first day of every month.

For purposes of calculating the predicted time of disbursement, the remittance system can schedule one or more jobs with the job scheduling module for each step in the partnerspecific model. The job can be "empty" in the sense that the job, when executed by the job scheduling module, performs no action (e.g., because the job is an empty set of computerexecutable instructions) or performs an action the result of which is inconsequential to the remittance system for purposes of calculating the predicted time. Each step in the model can be scheduled with job scheduling module as a job according to the step's frequency and offset. In some embodiments, each job is scheduled using cron expression syntax supported by the job scheduling module. For example, if the step's frequency and offset are 9:00 am, 2:00 pm, and 4:30 pm every Monday through Friday, the remittance system can schedule a job with the job scheduling module having the following three cron expressions: "0 0 9? *MON-FRI", "0 0 14? *MON-FRI", and "0 30 16? *MON-FRI".

In some embodiments, to calculate the predicted time of disbursement in response to a request from a payer to initiate an online EFT, the remittance system calculates a predicated "injection time" which represents an estimated time in the future at which the remittance system will submit the online EFT request to the partner for disbursement to the payee. Typically, the injection time is after the online EFT request has undergone fraud screening and payment processing (e.g., charging the payer's credit card) and can range from seconds to days after the online EFT request is initiated depending on whether the request is tagged for manual fraud screening and whether payment processing can be expedited, for example, because the payer is funding the online EFT by a bank debit card or a credit card. The remittance system can predict the injection time relative to the request time based on an obtained estimate of the time needed to perform fraud screening of the request added to an estimate of the time needed to perform payment processing for the request added to the request time.

Next, the remittance system iteratively queries the job scheduling module for steps in the partner-specific model starting with a first step. For each such step, the remittance system queries the job scheduling module for the earliest time not in a blackout period that the one or more jobs scheduled for the step will next execute after a specified input time. The query can specify any excluded set of times (i.e., blackout periods) when the partner will not perform the disbursement action corresponding to the step. The specified input time for the first processing step can be the predicted injection time. For each step, the remittance system adds the duration of the step to the earliest time output by the query for the step. The remittance system provides the result of this addition as input to the query for the next step or steps. The remittance system can calculate the predicated time of disbursement by adding the duration of the last step to the earliest time output by the query for the last step.

The remittance system can return the predicted disbursement time to the payer, send it in an e-mail or text message, make it available for viewing on a web page, or otherwise provide the predicted disbursement time to the payer. By using the job scheduling module and the partner-specific model of the partner's disbursement process, the remittance system can calculate accurate disbursement time predictions for online EFTs that are disbursed by the partner. Such predictions take into account the specific periodic disbursement processing schedules of the partner, time zone differences between the source and destination countries, and any blackout periods (e.g., holidays). Such predictions can be provided to payers before payers request online EFTs or immediately after or soon after the payers request online EFTs (e.g., in response to the requests). Such predictions can be updated based on electronically received feedback from the partner on the progress of the disbursements. For example, predicted disbursement times can be re-calculated based on actual times of already known completed disbursement actions and the steps in the model for the yet-to-be completed disbursement actions. For example, an initial predicted disbursement time can be re-calculated in response to detecting that the actual time of completion for a disbursement action is not within a margin of error of the initially predicted completion time for the action.

Thus, an online remittance system and methodology is provided with new and improved techniques for predicting disbursement time of online EFTs, thereby increasing the effectiveness, efficiency, and user satisfaction with such a system and methods. Such a system and methods may complement or replace existing systems and methods for predicting disbursement time.

For a better understanding of the aforementioned embodiments of the invention as well as addition embodiments thereof, reference will now be made to the drawings.

Exemplary Online Remittance Service Computer System Environment

Figure 1B:
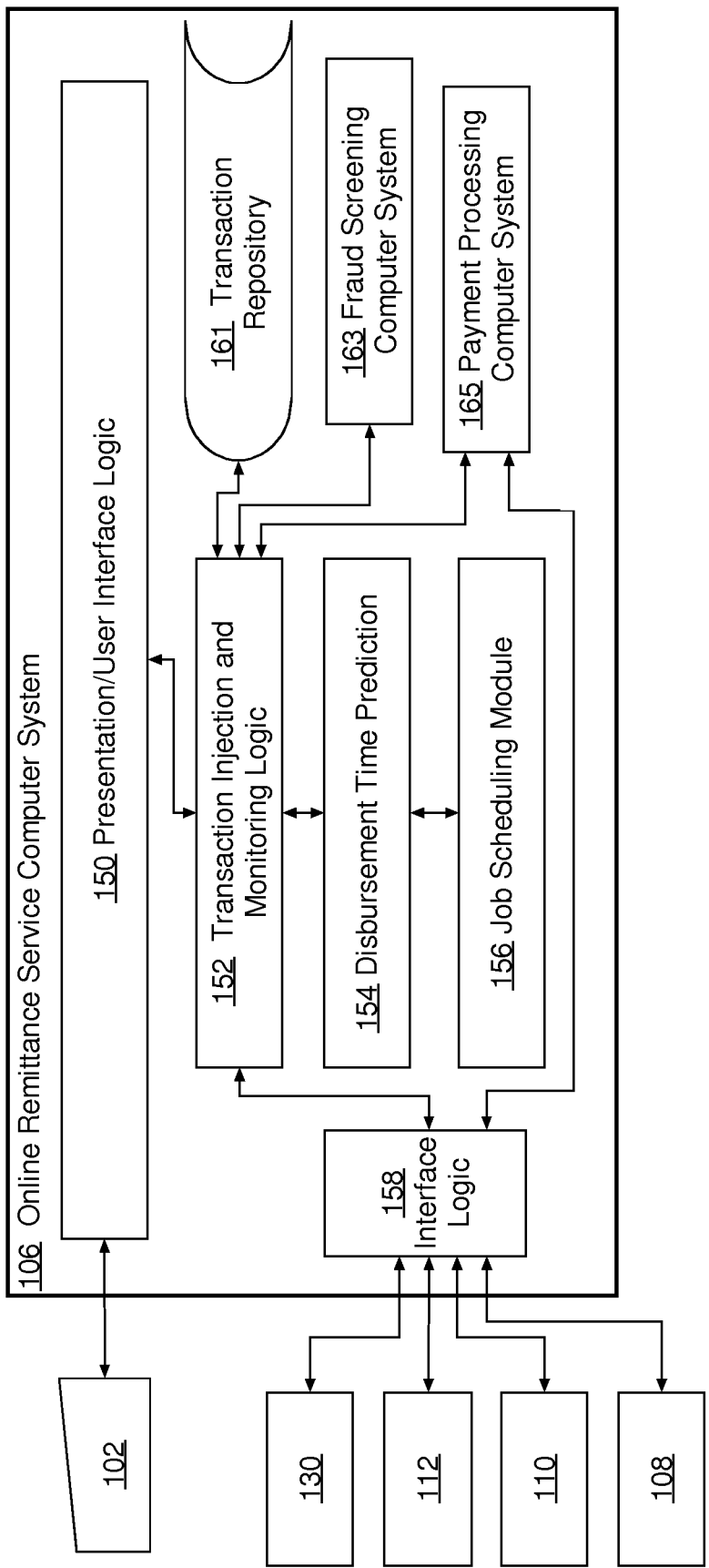
FIG. 1B is a block diagram illustrating an online remittance service computer system.

FIG. 1A illustrates a computer system that can be used to implement techniques for predicting disbursement times of online EFTs. FIG. 1B illustrates example internal logic of the online remittance computer system of FIG. 1A. The techniques can be used in the context of funds transfer transactions in which a payer sends money to a payee. Each of the payer and payee can be an individual, business, or other entity. The payee can be geographically distant from the payer, for example, in a different country. Thus, the transaction can be an international money transfer to a different country and having different currencies associated with the payer's country and the payee's country.

Referring first to FIG. 1A, it illustrates payer computers 102 communicatively coupled, directly or indirectly through one or more networks, to online remittance service computer system 106. Typically, payer computer 102 is a laptop computer, notebook computer, tablet computer, smart phone, personal computer or workstation associated with an individual user of a money transfer service hosted on computer system 106, and the online remittance service computer system 106 is one or more server-class computers in one or more data centers or other hosting facility. Payer computers 102 and online remittance computer system 106 can be coupled using any of a LAN, WAN, or one or more internetworks, and each arrow shown in FIG. 1A with a straight line can represent a network link using any of a LAN, WAN, or one or more internetworks.

One or more source banks 120, at which payers have deposited money or have access to an account, act as originating depository financial institutions (ODFis). Online remittance service computer system 106 acts as an automated clearing house (ACH) transaction originator. The online remittance service computer system 106 can be coupled to one or more ACH operator computer systems 130, which are owned by, operated by or associated with one or more ACH operators. Example ACH operators include, but are not limited to, any of a Federal Reserve Bank of the United States, Electronic Payments Network (EPN), a Pan-European Automated Clearing House (PE-ACH), or EBA Clearing Company. Transactions in this disclosure can include domestic FedACH transfers, FetACH International ACH Transactions (IATS), or other forms of transfers using any of the foregoing operators. However, embodiments can be implemented in connection with other transaction clearing systems and operators. Thus, the term "ACH" in this disclosure refers broadly to any transaction clearing system or operator suitable capable of supporting or inter operating with an embodiment of the present invention.

Optionally, online remittance service computer system 106 is coupled to one or more ACH processing service computers 112, which are configured to receive transaction information and to originate ACH transactions at the ACH operator computer systems 130 on behalf of a service, company or entity that owns or operates an online remittance service using computer system 106. In this arrangement, ACH processing service computers 112 allow the online remittance service computer system 106 to handle money transfers without having to interact directly with ACH operator computer systems 130. Examples of operators of ACH processing service computers 112 include, but are not limited to, Metal, Bank of America, and Wells Fargo. The online remittance service computer system 106 can inter operate with any number of ACH processing service computers 112 of different service providers.

The ACH operator computer systems 130 are coupled to the source banks 120. Optionally, ACH operator computer systems 130 can be coupled to and inter operate with destination banks 110 that are associated with payees 104; this arrangement is used to facilitate electronic funds transfers held at source banks 120 to destination banks 110, when the payers wish to electronically transfer funds to the payees 104. [

Additionally or alternatively, the payers may wish to provide cash or hard currency to payees 104. To facilitate a direct payment of cash, the online remittance service computer system 106 may be coupled to one or more partner organizations 108 that are configured to deliver cash to payees 104 or to receive a visit from payees 104 to pick up cash at partner organizations 108.

Exemplary Online Remittance Service Computer System Software Architecture

Referring now to FIG. 1B, in some embodiments, online remittance service computer 106 comprises presentation/user interface logic 150 that is configured to generate a user interface for an online EFT service for display at client computers such as payer computer 102. For example, presentation/user interface logic 150 may be configured to generate a graphical user interface in the form of static or dynamic HyperText Markup Language (HTML) pages that are delivered to and rendered by a browser hosted on payer computers 102. Additionally or alternatively, payer computers 102 can host locally installed client applications that interact with a presentation software layer of online remittance service computer system 106.

Online remittance service computer system 106 further comprises transaction injection and monitoring logic 152 (transaction logic 152) coupled to presentation/user interface logic 150, to disbursement time prediction logic 154 (prediction logic 154), to interface logic 158, to transaction repository 161, to fraud screening computer system 163, and to payment processing computer system 165. Although in FIG. 1B transaction repository 161, fraud detection system 163 and payment processing system 165 are shown inside the box representing online remittance service computer system 106, transaction repository 161, fraud detection system 163, and/or payment processing system 165 can be implemented on other computers external to the computer or computers that implement online remittance service computer system 106.

Transaction logic 152 can be configured to receive, from presentation/user interface logic 150, user input representing requests for online EFT transactions, and to initiate or cause initiating electronic funds transfer transactions based on the request data, by communicating through interface logic 158 to ACH operator computer systems 130, ACH processing service computer system 112, destination banks 110, and/or partner organizations 108.

Initiating or causing initiation of an EFT transaction based on request data is referred to herein as "injecting" the transaction. The transaction logic 152 can inject an EFT transaction through interface 158 before or after a disbursement time for the EFT transaction has been predicted. In addition, the transaction logic 152 can inject the EFT transaction through interface 158 after the transaction has been screened for regulatory compliance and fraud by fraud screening system 163 and after the payment processing computer system 165 has processed the payer's method of payment (funding) for the EFT transaction.

Transaction logic 152 can also be configured to request and obtain predicted disbursement times for EFT transactions from prediction logic 154. Transaction logic 152 can also configured to send, through presentation/user interface logic 150, prediction data indicating the predicated disbursement times obtained from the prediction logic 154 for display at client computers such as payer computer 102. Transaction logic 152 can also be configured to send prediction data indicating the predicted disbursement times to payers via one or more messaging systems (not shown). Such messaging systems can include e-mail message systems and cellular text messaging systems. For this, transaction repository 161 or another data repository coupled to transaction logic 152 can store account profiles for payers that include e-mail addresses and/or phone numbers for the payers that transaction logic 152 can retrieve for sending the predication data via the messaging systems.

Transaction logic 152 can also be configured to receive progress updates on pending transactions through interface logic 158 from ACH operator computer systems 130, ACH processing service computer system 112, destination banks 110, and/or partner organizations 108. Transaction logic 152 can also be configured to request and obtain updated predicted disbursement times for pending electronic funds transfer transactions from prediction logic 154 for the partner disbursement actions yet to be performed for the pending transactions based on the received progress updates. Transaction logic 152 can also be configured to send update prediction data indicating the updated predicted disbursement times to payers informing them whether their transactions are on-schedule, ahead of schedule, or behind schedule with respect to prior predicated disbursement times.

Prediction logic 154 can be configured to receive requests from transaction logic 152 to calculate predictions on disbursement times for transactions. Such prediction requests can specify or indicate an injection time parameter, a disbursement type parameter, and a partner parameter for a transaction. The injection time can be the time the transaction was or will be injected through interface 158. The disbursement type for the transaction can specify whether the disbursement to the payee is by deposit into a bank account, cash pick-up, or cash courier—16—delivery. The partner parameter can indicate the partner used by the remittance system to disburse the funds to the payee. The prediction logic 154 can be configured to use the partner parameter to obtain or reference the model of the partner's disbursement processing schedule.

Prediction logic 154 can also be configured send requests to job scheduling module 156 as part of calculating disbursement time predictions. In particular, prediction logic 154 can be configured to iteratively query jobs previously scheduled with the job scheduling module 156 and representing disbursement actions of partner disbursement processing schedules. Such queries can be made by the prediction logic 154 to obtain the predicated disbursement times, which are returned to the transaction logic 152.

Job scheduling module 156 can be configured to schedule computer-executable jobs for execution on periodic basis. The scheduling software can run embedded within another computer application, be instantiated within an application server (e.g., a servlet container), run as a stand-along program (e.g., in its own Java Virtual Machine (JVM), or be instantiated as a cluster of stand-along programs (with load-balancing and fail-over capabilities). Jobs can be scheduled with the scheduling software using cron expressions. For example, the scheduling software can support creating cron expressions for jobs using a UNIX cron-like syntax or specification. The scheduling software can schedule jobs to execute when a given cron expression occurs. A cron expression can be created with the scheduling software with combinations of the following directives:

at a certain time of day (e.g., to the millisecond)
on certain days of the week
on certain days of the month
on certain days of the year
not on certain days (such as business or government holidays)
repeated a specific number of times
repeated until a specific time/date
repeated indefinitely
repeated within a delay interval The scheduling software can provide a programmatic interface whereby for a given cron expression associated with a scheduled job, the programmatic interface can be queried to determine when the cron expression will next occur after a specified input date/time. The scheduling software can also support creating cron expressions relative to a specified time zone. For example, the scheduling system can support creating a cron expression for a disbursement action performed by a partner for disbursing funds to payees India relative to a time zone in India (e.g., UTC+5). Similarly, the programmatic interface for determining when a cron expression will next occur can accept the specified date/time in a specified time zone (e.g., UTC−8) and the date/time of the next occurrence returned by the programmatic interface can specify a time zone (e.g., UTC−8 or UTC+5). In other words, the programmatic interface for determining when a cron expression will next occur can account for the specified input date/time being relative to a different time zone than the time zone of the cron expression and return a correct date/time relative to the time zone of the specified input date/time or the time zone of the cron expression.

For purposes of discussion, this description presents certain examples in which it is assumed that the job scheduling module 156 is a version of the JAVA-based QUARTZ job scheduling service, currently available as open-source software from quartz-scheduler.org. The present invention, however, is not limited to any particular job scheduling software or module. Instead, the present invention can be implemented with any type of job scheduling software or module capable of supporting the methodologies of the present invention presented in detail herein.

Fraud screening computer system 163 can perform regulatory compliance and fraud screening on EFT transactions requested by payers. It may take minutes to days for fraud screening computer system 163 to screen an EFT transaction depending on whether the EFT transaction can be automatically screened and cleared by the fraud screening computer system 163, which can take only second to minutes, or whether during automatic screening, the fraud—18— screening computer system 163 flags the EFT transaction for manual screening requiring human intervention, which can take longer (e.g., few to many days).

Fraud screening computer system 163 can be configured to provide an estimated time to perform screening for a given EFT transaction. Typically, such estimates depend on the number of EFT transactions the fraud screening computer system 163 is currently processing. Further, such estimates can be made assuming the EFT transactions will not be flagged for manual screening.

Payment processing system 165 can be configured to process funding of transactions from payer designated bank accounts by interoperation with ACH operator computer systems 130 and/or ACH processing service computer systems 112. Payment processing computer 165 can be configured to provide an estimate to perform payment processing for a given EFT transaction. Typically, such estimates depend on whether the payment processing of the EFT transaction through the ACH operators and/or processing services can be expedited or not. If expedited, then payment processing can be performed in a matter of minutes or less, for example. If not expedited, then payment processing can require days to complete. Payers can designate bank accounts for funding EFT transactions through a user interface presented at payer computers 102. Such designated bank accounts can include bank accounts associated with a routing and account number, a credit card, or debit card.

Transaction repository 161 provides data storage capabilities for transaction logic 152. Transaction logic 152 can be configured to read and write data representing transactions from and to the transaction repository 161, which may comprise a database, file system or other data repository. Although not shown as coupled in FIG. 1B, prediction logic 154 and/or job scheduling module 156 can also be configured to read and write to and from the transaction repository 161 or other data repository (not shown).

Exemplary Partner-Specific Model

Figure 2:
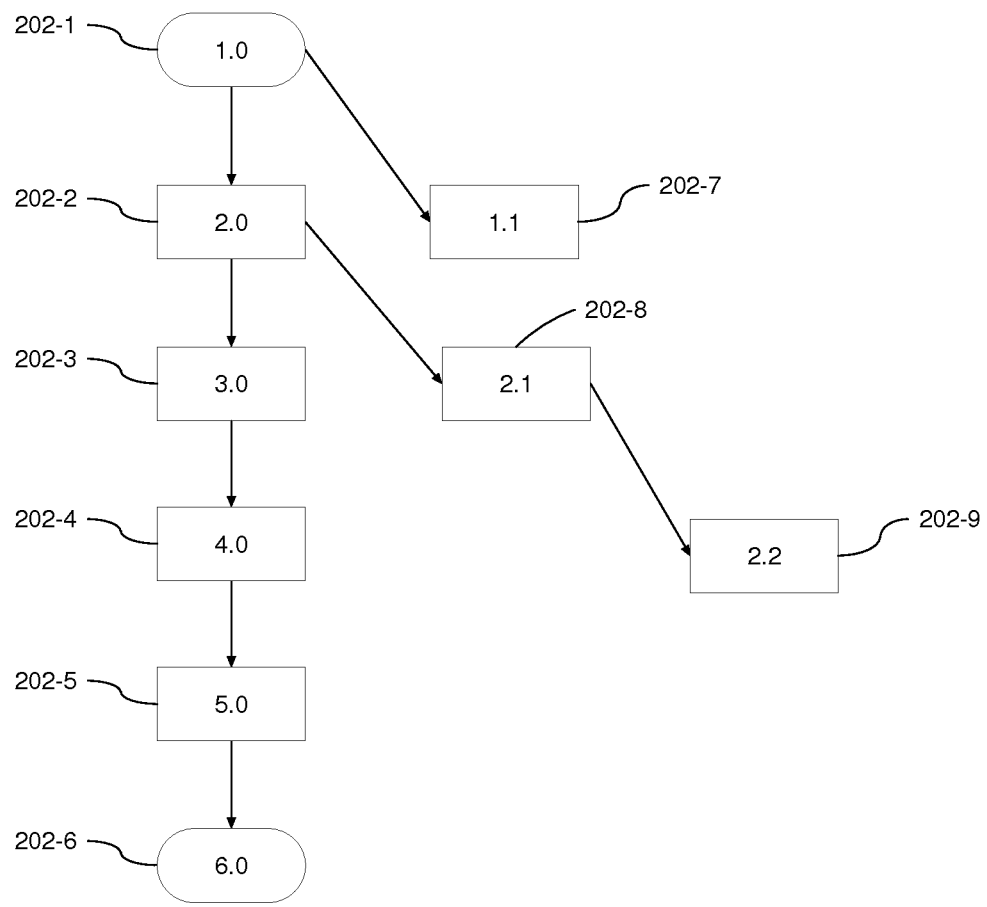
FIG. 2 is a diagram illustrating a partner-specific model of a partner-specific disbursement process.

Referring now to FIG. 2, it is a diagram illustrating an exemplary partner-specific model 200 representing a partner-specific disbursement process for disbursing funds to payees in—19—a destination country, according to some embodiments of the present invention. As shown, the model 200 includes a number of steps 202. Each step 202 corresponds to a disbursement action of the partner's disbursement process. Exemplary disbursement actions include but are not limited to, batch processing of EFT requests, depositing funds into accounts, making funds available for cash pick-up, sending funds out for cash delivery by courier, or any other action performed by the partner in connection with or related to remitting and/or disbursing funds to payees in the destination country.

Each step 202 in FIG. 2 is numerically labeled to convey disbursement action ordering. For example, the action corresponding to step 202-2 (2.0) is initiated after the action corresponding to step 202-1 (1.0) completes and the action corresponding to step 202-9 (2.2) is initiated after the action corresponding to step 202-8 (2.1) completes. The partner's disbursement process starts with initiation of the action corresponding to step 201 (1.0) and ends with the completion of the action corresponding to step 202-6 (6.0).

As exemplified by model 200, a partner's disbursement process can have a "trunk" sequence of steps and one or more "branch" sequences of steps. For example, model 200 has a trunk sequence of steps that include steps 202-1 (1.0) through 202-06 (6.0). Model 200 also has two branch sequences. A first sequence branches from trunk step 202-1 (1.0) and includes branch step 202-7 (1.1). A second sequence branches from trunk step 202-2 (2.0) and includes branch steps 202-8 (2.1) and 202-9 (2.2). The trunk sequence of steps can correspond to the primary disbursement actions such as, for example, remitting and/or disbursing funds to payees in the destination country. Each branch sequence can correspond to ancillary disbursement actions such as, for example, notifying the online remittance system or sub-partners that performed prior actions on the progress of disbursement.

The action corresponding to the first branch step of a branch sequence can be initiated after the action corresponding to the base trunk step of the branch sequence completes. For example, the disbursement action corresponding to branch step 202-7 (1.1) can be initiated after the action corresponding to the base trunk step 202-1 (1.0) completes.

Actions corresponding to branch steps can be performed in parallel with actions corresponding to trunk steps initiated after the action corresponding to the base trunk step of the branch sequence completes. For example, the disbursement action corresponding to branch step 202-7 (1.1) can be performed while any of trunk steps 202-2 (2.0), 202-3 (3.0), 202-4 (4.0), 202-5 (5.0), or 202-6 (6.0) are being performed. Similarly, the disbursement actions corresponding to branch steps 202-8 (2.1) and 202-9 (2.2) can be performed while any of trunk steps 202-3 (3.0), 202-4 (4.0), 202-5 (5.0), and 202-6 (6.0) are being performed. However, the disbursement action corresponding to branch step 202-9 (2.2) is initiated only after the action corresponding to branch step 202-8 (2.1) completes.

Each step in a partner-specific model can be represented as one or more data records in a database or datastore. The records can be associated with ordering information that specifies the trunk sequence and any branch sequences and the ordering of steps within the trunk sequence and branch sequences. For example, each step can be assigned a number conveying whether the step is a trunk step or a branch step and if a trunk step, the order of the step within the trunk sequence, and if a branch step, the order of the step within the branch and the base trunk step of the branch. Such a numerical assignment scheme is illustrated in FIG. 2. For example, the number 3.0 indicates that step 202-3 is after trunk steps 202-1 (1.0) and 202-2 (2.0) and before trunk steps 202-4 (4.0), 202-5 (5.0), and 202-6 (6.0) in the trunk sequence. The number 2.1 indicates that step 202-8 is a branch step from base trunk step 202-2 (2.0). The number 2.1 also indicates that step 202-8 is before step 202-9 (2.2) in the branch sequence.

The stored records for a step can include schedule information for the disbursement action corresponding to the step. In particular, the stored records for the step can specify:

A duration for the corresponding disbursement action which represents how long it takes the partner to perform the corresponding disbursement action (e.g., 15 seconds 600 seconds, 1 seconds, etc.)

A frequency and optionally an offset for the corresponding disbursement action which represents when and how often the partner initiates performance of the corresponding disbursement action. For example, at the third minute past every hour of every day and every five minutes thereafter. In this example, the frequency is every five minutes of every hour of every day and the offset is starting at the third minute past every hour.

A time zone for the corresponding disbursement action which specifies the time zone the partner's schedule is relative to (e.g., UTC−8).

The stored records for a step can also specify any blackout periods when the partner will not perform the corresponding action even if it would otherwise be performed according to the frequency and offset information for the step. Examples of blackout periods include, but are not limited to, national or business holidays. Typically, a blackout period will correspond to an entire day or a set of days. However, a blackout period can correspond another period of time such as a period spanning second, minutes, or hours. For example, a blackout period can correspond to a planned partner outage, for example, to conduct maintenance on systems the partner uses to disburse funds.

Since most if not all steps of a model can have the same blackout periods, the set of blackout periods can be associated in the database or datastore with the model as a whole as opposed to individual steps of the model. In some embodiments, a set of blackout periods is associated with the model as a whole and individual sets of blackout periods are associated with individual steps on a step-by-step basis. In these embodiments, if a step of the model is associated with an individual set of blackout periods, that set of blackout periods overrides the set of blackout periods associated with the model as a whole only for that step. In any case, each step in a partner-specific model can be associated with one or more of a duration, a frequency, an offset, and a time zone.

It should be understood that the model 200 is merely an example of a partner's disbursement process and other models can have a different number of steps and in a different arrangement than model 200. For example, a model can have more or less trunk steps, more or—22—less branch sequences, and/or more or less branch steps in each branch sequence than is shown in FIG. 2.

Process for Predicting Disbursement Time for an Online EFT

Each step of a partner-specific model can be scheduled with the job scheduling module as a job. That is, scheduled as a job that, when executed by the job scheduling module, does not perform any action or at least does not perform any action of consequence for purposes of predicting disbursement time.

Each step of the model can be scheduled with the job scheduling module as a job based on the step's frequency and offset and the set of blackout periods associated with the step, if any. Scheduling a step as a job with the job scheduling module can involve specifying one or more cron expressions for the job to the job scheduling module. Acron expression can be specified to the job scheduling module according to a cron-link syntax or specification. More than one cron expression may need to be specified for a job depending on the complexity of the step's frequency and offset. For example, if the step's frequency and offset are 9:00 am, 2:00 pm, and 4:30 pm every Monday through Friday, the three cron expressions may be needed, for example: "0 0 9? *MON-FRI", "0 0 14? *MON-FRI", and "0 30 16? *MON-FRI". Acron expression for a job can also be configured with blackout periods (e.g., calendar dates) specifying when the job scheduling module is not to execute the job. Further, each cron expression of a job can be scheduled with the job scheduling module according to the step's time zone. The time zone of a cron expression can be specified to the job scheduling module as a time offset from a base or reference time zone such as Coordinated Universal Time (UTC) or Greenwich Mean Time (GMT).

As discussed above, to calculate the predicted time of disbursement for an online EFT according to a partner-specific model, the remittance system can iteratively query the job scheduling module for jobs scheduled for the model starting with the job scheduled for a first step of the model. Each query for a job asks the job scheduling module when the cron expression or cron expressions specified for the job will next occur after a specified input time. The—23—specified input time can be relative to a time zone which can also be specified in the query. If one cron expression is specified for a job, the time at which the cron expression will next occur after the specified input time is the time at which the partner is considered to next initiate performance of the disbursement action corresponding to the step. If multiple cron expressions are specified for a job, the cron expression that occurs the earliest after the specified input time is considered to be time at which the partner will next initiate performance of the disbursement action corresponding to the step. In some exemplary non-limiting embodiments in which the job scheduling module is a version of the JAVA QUARTZ job scheduler, the query involves invoking (calling) the function getFireTimeAfter( ) on object instances representing cron expressions that implement the org.quartz.Trigger interface. The function accepts a java.util.Date instance which can be the specified input time relative to a particular time zone and also returns a java.util.Date instance which is the time at which the job will next occur after the specified input time and relative to a particular time zone. The job scheduling module can handle converting dates and times between input and output time zones. However, it should be understood that the present invention is not limited to any particular job scheduling module and other jobs scheduling modules including job scheduling modules developed by third-parties and job scheduling modules developed by those practicing an embodiment of the present invention can be used.

The specified input time for the query for the job scheduled for the first step of the model can be a predicted or actual "injection time". If an actual injection time, then the specified input time is the time the remittance system submitted the online EFT request to the partner. An actual injection time of an online EFT can be a time after the remittance system has completed fraud screen and payment processing for the online EFT. If a predicted injection them, then the injection time is a time in the future that the remittance system expects to submit the online EFT to the partner. A predicted injection time of an online EFT can include an estimate of how long it will take to perform fraud screening for the online EFT and an estimate of how long it will take to perform payment processing for the online EFT. The output time return by the query for the job scheduled for the first step is added to the duration for the first step and the result is used as the specified input time for the query for the job scheduled for a next step or steps. For each step, the remittance system adds the duration of the step to the earliest time output by the query for the step. The remittance system provides the result of this addition as input to the query for the next step or steps. The remittance system can calculate the predicated time of disbursement by adding the duration of the leaf step of the trunk branch to the earliest time output by the query for the leaf step of the trunk branch.

Figure 3:
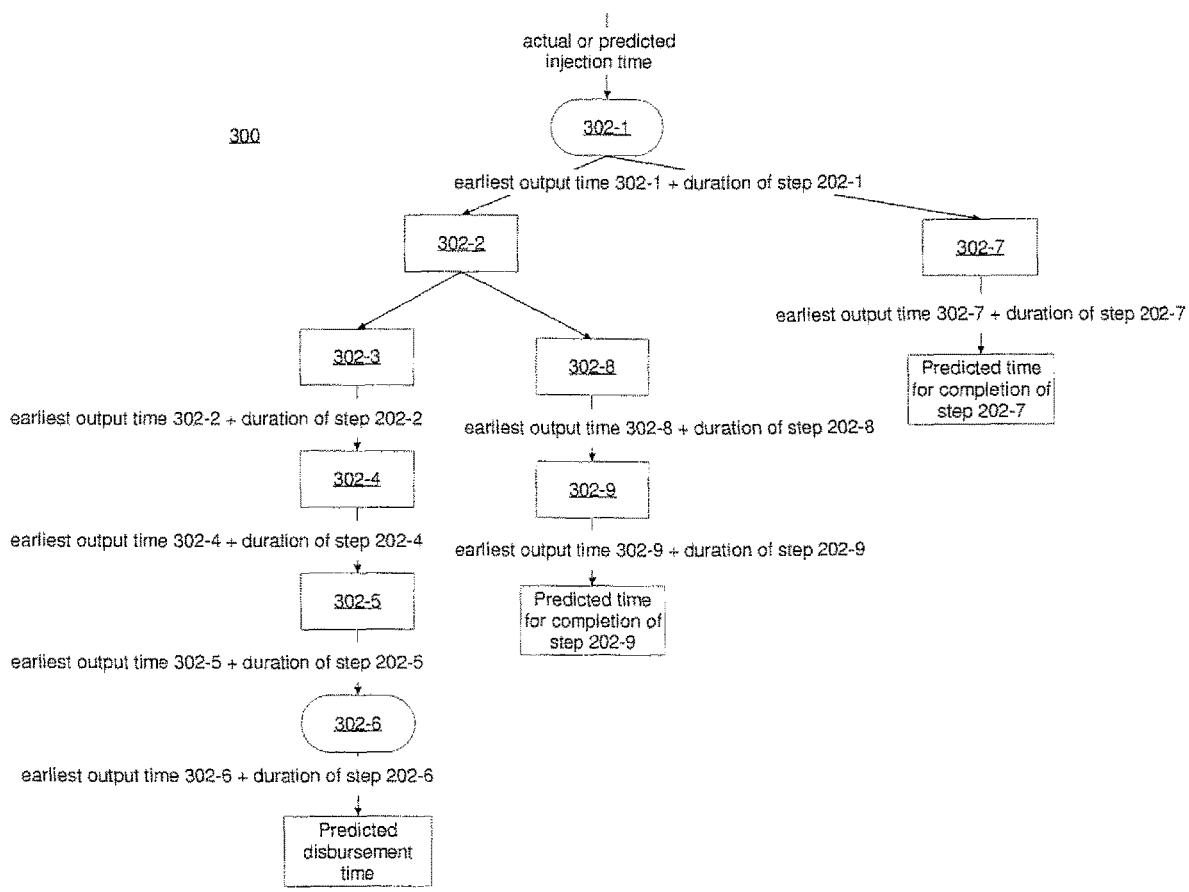
FIG. 3 is a diagram that illustrates calculating a predicted disbursement time using a job scheduling module.

Referring now to FIG. 3, it is a diagram illustrating a process for predicting disbursement time for an online EFT using the exemplary partner-specific model 200 of FIG. 2. Each step 202 of model 200 is scheduled with the job scheduling module as a job 302. For example, step 202-1 is scheduled as job 302-1, step 202-2 is scheduled as job 302-2, etc. Each job can be scheduled with a job scheduling module according to one or more cron expressions as discussed above.

Initially, each cron expression of a job 302-1 is queried for the next time the cron expression will next occur after an input injection time. As discussed above, the injection time can be an actual injection time or a predicted injection time. Then, the earliest output time from the cron expression queries for job 302-1 is added to the duration of step 202-1 and the resulting time is provided as input to similar queries on the cron expressions of jobs 302-2 and 302-7. This process is repeated for remaining steps 202 of the model 200 in which the earliest time output by the queries on the cron expressions for the job 302 corresponding to a step 202 is added to the duration of the step 202 and the result is provided as input to the queries on the cron expressions for the job 202 corresponding to the next step 202 in the model. If there is not a next step 202 in the model for a given step 202, then the earliest time output by the queries on the cron expressions for the job 302 corresponding to the given step plus the duration of the given step 202 is the predicted completion time for the branch. If the branch is the trunk branch of the model 200, then that time is the predicted time of disbursement (e.g., when the funds will be available for cash pickup or sent out for delivery) for the online EFT. For example, the earliest time output by the queries on the cron expressions for job 302-6 corresponding to trunk step 202-6 of model 200 plus the duration of step 202-6 is the predicted time of disbursement.

If the remittance system is notified of an actual time of completion for a trunk step of the model, then the remittance system can update the prediction starting with that trunk step. For example, if the remittance system receives an actual time of completion for trunk step 202-4 of model 200, then that time can be input to queries on the cron expressions for job 302-5. The prediction would then be calculated as before for the remaining trunk steps in the trunk branch to generate a new prediction.

In some embodiments, the remittance system many not receive notification of actual completion times for all steps of the model. For example, the remittance system may receive such notification for only leaf steps of the model. Further, the remittance system may receive such notification for only some but not all leaf steps of the model. For example, referring to model 200, the remittance system may not receive notification of actual completion time for step 202-9. Such a notification may not be received for any number of reasons. For example, the partner that performed the action corresponding to step 202-9 may have not sent a notification to the remittance system after completion. In this case, the remittance system can update the predicted completion times for other leaf steps based on the current time (e.g., a time corresponding to when it was detected that notification of an actual completion time for a step was not received). For example, if the actual time of completion for step 202-7 has been received but the actual time of completion for step 202-9 has not been received and the predicted time of completion for step 202-9 has passed, then the current time can be input to queries on the cron expressions for job 302-2 corresponding to step 202-2. The predictions for steps 202-6 and 202-9 would then be calculated as before for remaining trunk steps ending at step 202-6 and the remaining branch steps ending at step 202-9. Here, the current time can be input to queries on the cron expressions for job 302-2 corresponding to step 202-2 because it is known that step 202-1 completed based on receiving notification of the actual completion time for step 202-7.

Computer-Based Implementation

The computer-implemented techniques of the present invention may be implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer system, server computer systems, portable computer systems, handheld electronic devices, networking devices or any other computing device that incorporates hardwired and/or program logic to implement the techniques.

Figure 4:
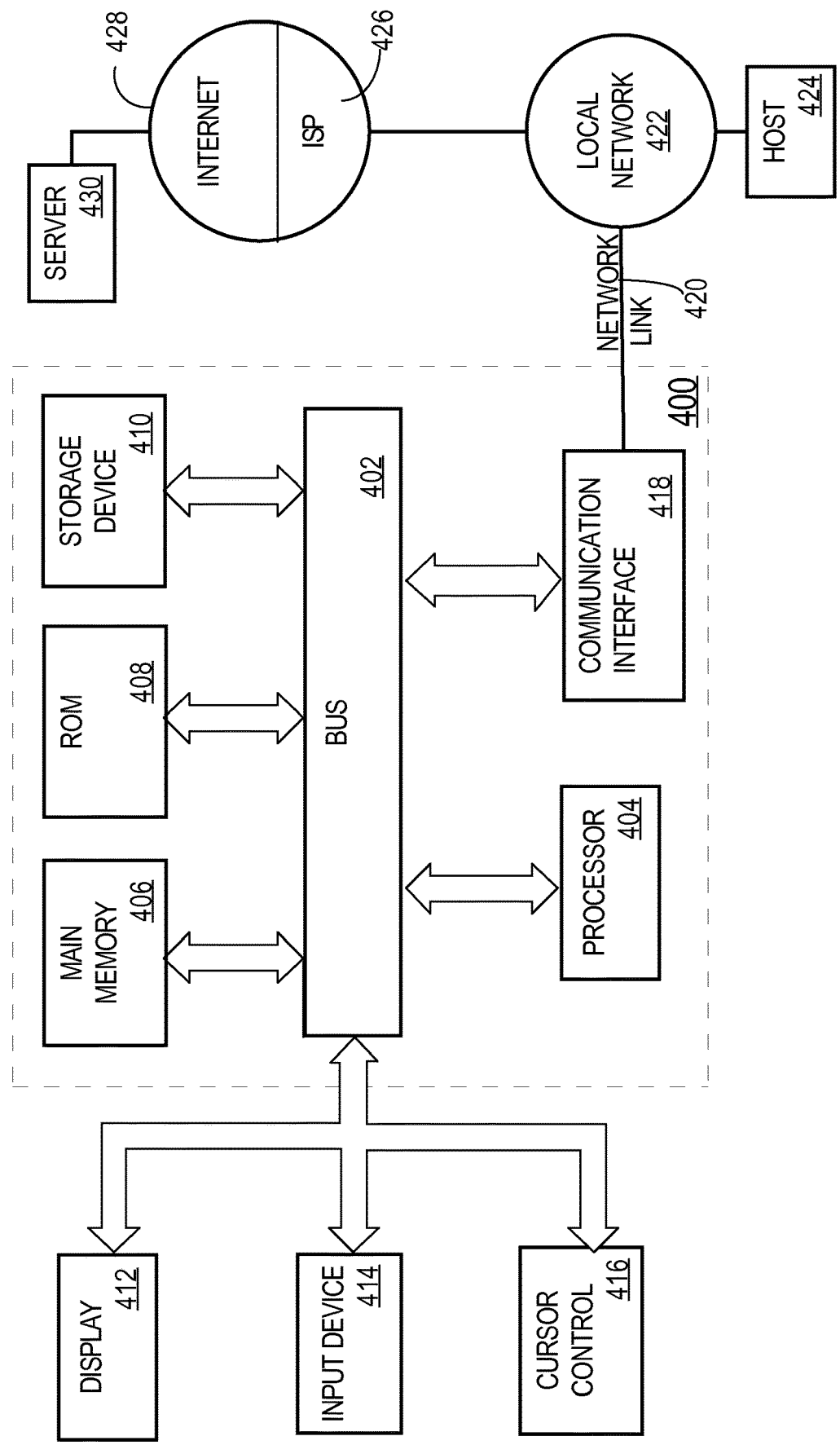
FIG. 4 is a very general diagram of a computer system on which software implemented techniques of the present invention can be embodied.

For example, FIG. 4 is a block diagram that illustrates a computer system 400 upon which an embodiment of the invention can be implemented. Computer system 400 includes a bus 402 or other communication mechanism for communicating information, and a hardware processor 404 coupled with bus 402 for processing information. Hardware processor 404 can be, for example, a general purpose microprocessor. Although only one hardware processor 404 is shown in FIG. 4, computer system 400 can have more than one hardware processor 404 coupled to bus 402 for processing information.

Computer system 400 also includes a main memory 406, such as a random access memory (RAM) or other dynamic storage device, coupled to bus 402 for storing information and instructions to be executed by processor 404. Main memory 406 also can be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 can be coupled via bus 402 to a display 412, such as a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

A touch-sensitive surface can overlay display 412 as an input device 414 to form a touch-sensitive display that provides an input interface and an output interface between the system 400 and a user. The touch-sensitive surface can be a sensor or set of sensors that accepts input from the user based on haptic and/or tactile contact. Contact with the touch-sensitive surface can be made by the user with a stylus or set of styluses or a finger or a set of fingers. The touch-sensitive surface can detect contact and any movement or breaking thereof using any of a plurality of touch sensing techniques now known or later developed including, but not limited to, capacitive, resistive, infrared, and acoustic wave techniques, as well as other proximity sensor arrays or other elements for detecting one or more points of contact, movement of contact, and breaking of contact with the touch-sensitive surface.

Although display 412, input device 414, and cursor control 416 are illustrated outside the dashed box representing computer system 400 in FIG. 4, it should be understood that one or more of display 412, input device 414, and cursor control 416 can be part of the form factor of the computer system 400. For that matter, although main memory 406, ROM 408, storage device 410, bus 402, processor 404, and communication interface 418 are illustrated inside the dashed—28—box representing computer system 400, it should be understood that one or more of these components can be external to the form factor of the computer system 400 and operatively coupled to the form factor through a peripheral interface.

Computer system 400 can implement the techniques described herein using customized hard-wired logic, one or more ASICs or FPGAs, firmware and/or program logic which, in combination with the computer system, causes or programs computer system 400 to be a special-purpose machine. According to one embodiment, the techniques herein are performed by computer system 400 in response to processor 404 executing one or more sequences of one or more instructions contained in main memory 406. Such instructions can be read into main memory 406 from another storage medium, such as storage device 410. Execution of the sequences of instructions contained in main memory 406 causes processor 404 to perform the process steps described herein. In alternative embodiments, hard-wired circuitry can be used in place of or in combination with software instructions.

The term "storage media" as used herein refers to any non-transitory media that store data and/or instructions that cause a machine to operation in a specific fashion. Such storage media can comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but can be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media can be involved in carrying one or more sequences of one or more instructions to processor 404 for execution. For example, the instructions can initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 can optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 can be an integrated services digital network (ISDN) card, cable modem, satellite modem, or a modem to provide a data communication connection to a corresponding type of telephone line. As another example, communication interface 418 can be a local area network (LAN) card to provide a data communication connection to a compatible LAN. Wireless links can also be implemented. In any such implementation, communication interface 418 sends and receives electrical, electromagnetic or optical signals that carry digital data streams representing various types of information.

Network link 420 typically provides data communication through one or more networks to other data devices. For example, network link 420 can provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link—30—420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code can be executed by processor 404 as it is received, and/or stored in storage device 410, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method, comprising:
  receiving, by an online remittance system from a first user device in a first geographical area, a request to initiate an electronic funds transfer to disburse funds to a user account associated with a second user in a second geographical area;
  accessing, by the online remittance system, a database that includes information corresponding to a plurality of models, wherein each of the plurality of models corresponds to a respective disbursement process for disbursing funds to users in destination geographic areas;
  based on information specified by the request, retrieving, by the online remittance system from the database, a particular one of the plurality of models, wherein the particular model corresponds to a disbursement process for disbursing funds to users in the second geographical area;
  based on the particular model, scheduling, by the online remittance system, one or more computer-executable (CE) jobs using one or more cron expressions, the one or more CE jobs representing one or more steps of the disbursement process;
  determining, by the online remittance system based on the request and on the one or more cron expressions, next execution times for each of the one or more cron expressions, the next execution times indicating respective times after which each of the one or more CE jobs will next execute; and
  generating, by the online remittance system based on the next execution times for the one or more CE jobs, output indicative of a predicted disbursement time at which the funds are expected to be disbursed to the user account associated with the second user.

2. The method of claim 1,
  wherein the first geographical area is a first country with a first set of electronic fund transfer rules; and
  wherein the second geographical area is a second country with a second set of electronic fund transfer rules.

3. The method of claim 1,
  wherein the particular model specifies a duration that indicates an amount of time for a partner in the second geographic area to complete the disbursement process; and
  wherein the particular model specifies a frequency that indicates a periodic schedule of a corresponding disbursement of the partner.

4. The method of claim 1, further comprising:
  generating a webpage for accessing the output indicative of the predicted disbursement time; and
  transmitting a link to the webpage to the first user device.

5. The method of claim 1, wherein the particular model comprises one or more steps, each of the one or more steps corresponding to a respective disbursement action of the disbursement process.

6. The method of claim 1, wherein the generating includes disregarding a result of a first CE job of the one or more CE jobs based on a type of the result.

7. The method of claim 1, wherein the generating includes selecting, as a next execution time for at least one job, an earliest next execution time associated with the one or more cron expressions.

8. The method of claim 1, further comprising:
  providing operation characteristics, including the predicted disbursement time, to the first user device.

9. The method of claim 1, further comprising:
  receiving an actual completion time for a first disbursement action of the disbursement process;
  responsive to receiving the actual completion time, determining a next execution time for a first CE job of the one or more CE jobs, the next execution time representing a time at which the first CE job will next execute after a specified time; and
  updating, based on the next execution time, the predicted disbursement time at which the funds are expected to be disbursed to the user account associated with the second user.

10. A device, comprising:
  a non-transitory, computer-readable memory storing instructions; and
  at least one processor configured to execute the instructions to cause the device to:
    receive a request from a first user device in a first geographical area, to initiate an electronic funds transfer to disburse funds to a user account associated with a second user in a second geographical area;

access a database that includes information corresponding to a plurality of models, wherein each of the plurality of models corresponds to a respective disbursement process for disbursing funds to users in destination geographic areas;

based on information specified by the request, retrieve, from the database, a particular one of the plurality of models, wherein the particular model corresponds to a disbursement process for disbursing funds to users in the second geographical area;

based on the particular model, schedule one or more computer-executable (CE) jobs using one or more cron expressions, the one or more CE jobs representing one or more steps of the disbursement process;

determine, based on the request and on the one or more cron expressions, next execution times for each of the one or more cron expressions, the next execution times indicating respective times after which each of the one or more CE jobs will next execute; and based on the next execution times for the one or more CE jobs, generate output indicative of a predicted disbursement time at which the funds are expected to be disbursed to the user account associated with the second user.

11. The device of claim 10,
wherein the first geographical area is a first country with a first set of electronic fund transfer rules; and
wherein the second geographical area is a second country with a second set of electronic fund transfer rules.

12. The device of claim 10,
wherein the particular model specifies a duration that indicates an amount of time for a partner in the second geographic area to complete the disbursement process; and
wherein the particular model specifies a frequency that indicates a periodic schedule of corresponding disbursement of the partner.

13. The device of claim 10, wherein executing the instructions further causes the device to:
receive an actual completion time for a first disbursement action of the disbursement process;
in response to receiving the actual completion time, determine a next execution time for a first CE job of the one or more CE jobs, the next execution time representing a time at which the first CE job will next execute after a specified time; and
update, based on the next execution time, the predicted disbursement time.

14. A non-transitory, computer-readable medium having instructions stored thereon, that are executable by an online remittance system to perform operations comprising:
receiving a request, from a first user device in a first geographical area, to initiate an electronic funds transfer to disburse funds to a user account associated with a second user in a second geographical area;

accessing a database that includes information corresponding to a plurality of models, wherein each of the plurality of models corresponds to a respective disbursement process for disbursing funds to users in destination geographic areas;

based on information specified by the request, retrieve, from the database, a particular one of the plurality of models, wherein the particular model corresponds to a disbursement process for disbursing funds to users in the second geographical area;

based on the particular model, scheduling one or more computer-executable (CE) jobs using one or more cron expressions, the one or more CE jobs representing one or more steps of the disbursement process;

determining, based on the request and on the one or more cron expressions, next execution times for each of the one or more cron expressions, the next execution times indicating respective times after which each of the one or more CE jobs will next execute; and generating, based on the next execution times for the one or more CE jobs, output indicative of a predicted disbursement time at which the funds are expected to be disbursed to the user account associated with the second user.

15. The non-transitory, computer-readable medium of claim 14,
wherein the first geographical area is a first country with a first set of electronic fund transfer rules; and
wherein the second geographical area is a second country with a second set of electronic fund transfer rules.

16. The non-transitory, computer-readable medium of claim 14,
wherein the particular model specifies a duration that indicates an amount of time for a partner in the second geographic area to complete the disbursement process; and
wherein the particular model specifies a frequency that indicates a periodic schedule of a corresponding disbursement of the partner.

17. The non-transitory, computer-readable medium of claim 14, wherein the operations further comprise:
providing the output indicative of the predicted disbursement time to the first user device.

18. The non-transitory, computer-readable medium of claim 14, wherein the operations further comprise:
receiving an actual completion time for a first disbursement action of the disbursement process;
in response to receiving the actual completion time, determining a next execution time for a first CE job of the one or more CE jobs, the next execution time representing a time at which the first CE job will next execute after a specified time; and
updating, based on the next execution time, the predicted disbursement time.

* * * * *